(12) United States Patent
Kubo et al.

(10) Patent No.: US 12,269,752 B2
(45) Date of Patent: *Apr. 8, 2025

(54) HALIDE PRODUCTION METHOD (71) Applicant: Panasonic Intellectual Property Management Co., Ltd., Osaka (JP)

(72) Inventors: Takashi Kubo, Hyogo (JP); Yusuke Nishio, Osaka (JP); Akihiro Sakai, Nara (JP); Akinobu Miyazaki, Osaka (JP)

(73) Assignee: PANASONIC INTELLECTUAL PROPERTY MANAGEMNT CO., LTD., Osaka (JP)

( * ) Notice: Subject to any disclaimer, the term of this patent is extended or adjusted under 35 U.S.C. 154(b) by 544 days.

This patent is subject to a terminal disclaimer.

(21) Appl. No.: 17/323,920

(22) Filed: May 18, 2021

(65) Prior Publication Data

US 2021/0269323 A1 Sep. 2, 2021

Related U.S. Application Data (63) Continuation of application No. PCT/JP2019/025437, filed on Jun. 26, 2019.

(30) Foreign Application Priority Data

Dec. 28, 2018 (JP) ................. 2018-247311

(51) Int. Cl.
*C01F 17/271* (2020.01)
*C01F 17/36* (2020.01)
(Continued)

(52) U.S. Cl.
CPC ............ *C01F 17/271* (2020.01); *C01F 17/36* (2020.01); *H01M 10/0525* (2013.01);
(Continued)

(58) Field of Classification Search
USPC ........................................ 423/263
See application file for complete search history.

(56) References Cited

U.S. PATENT DOCUMENTS 3,153,570 A * 10/1964 Domning .............. C01F 17/271
423/491
11,981,580 B2 * 5/2024 Kubo ................ H01M 10/0562
2019/0088995 A1 3/2019 Asano et al.

FOREIGN PATENT DOCUMENTS

CN 105254184 1/2016
CN 106745163 A 5/2017
(Continued)

OTHER PUBLICATIONS

Meyer, G. "The ammonium chloride route to anhydrous rare earth chlorides—The example of YCl3." in Inorganic Synthesis, vol. 25, 1989. (Year: 1989).*

(Continued)

*Primary Examiner* — Daniel Berns
*Assistant Examiner* — Zachary John Baum
(74) *Attorney, Agent, or Firm* — Rimon P.C.

(57) ABSTRACT

A method for producing a halide includes heat-treating a mixed material in an inert gas atmosphere, the mixed material being a mixture of $(NH_4)_a MX_{3+a}$ and LiZ. The M includes at least one element selected from the group consisting of Y, a lanthanoid, and Sc. The X is at least one element selected from the group consisting of Cl, Br, I, and F. The Z is at least one element selected from the group consisting of Cl, Br, I, and F. Furthermore, $0 < a \leq 3$ is satisfied.

20 Claims, 2 Drawing Sheets (51) Int. Cl.
    *H01M 10/0525* (2010.01)
    *H01M 10/0562* (2010.01)
(52) U.S. Cl.
    CPC ..... *H01M 10/0562* (2013.01); *C01P 2006/40* (2013.01); *H01M 2300/008* (2013.01)

(56) References Cited

FOREIGN PATENT DOCUMENTS

| | | |
|---|---|---|
| CN | 107516739 A | 12/2017 |
| EP | 3496202 A1 | 6/2019 |
| WO | 2018/025582 | 2/2018 |

OTHER PUBLICATIONS

Bohnsack, A., et al. "Ternary Halides of the A3MX6—Type VI.[1] Ternary Chlorides of the Rare-Earth Elements with Lithium, LhMCl6 (M=Tb—Lu, Y, Sc): Synthesis, Crystal Structures, and Ionic Motion." Z. anorg. allg. Chem. 623 (1997) 1067-1073. (Year: 1997).*

Meyer, G. "GdLiCl4, ein inverser Chloroscheelit." Z. anorg. allg. Chem. 511 (1984) 193-200. (Year: 1984).*

English machine translation of Meyer, G. "GdLiCl4, ein inverser Chloroscheelit." Z. anorg. allg. Chem. 511 (1984) 193-200. (Year: 1984).*

Meyer, G., et al. Versatility and low-temperature synthetic potential of ammonium halides. Inorg. Chem. 1985, 24 3504-3505. (Year: 1985).*

Wei, H., et al. Tacking single crystal growth challenges for mixed-elpasolite scintillators. Cryst. Growth Des. 2016, 16, 4072-4081. (Year: 2016).*

Yaws, Carl L. (2010). Enthalpies of Vaporization at the Boiling Point. In Yaws' Thermophysical Properties of Chemicals and Hydrocarbons (Electronic Edition). Knovel. Retrieved from https://app.knovel.com/hotlink/toc/id:kpYTPCHE02/yaws-thermophysical-properties/yaws-thermophysical-properties. (Year: 2010).*

The Extended European Search Report dated Jan. 28, 2022 for the related European Patent Application No. 19903989.2.

"Steiner H-J et al: ""Novel fast ion conductors of the type MI3MIIIC16 (MI=Li, Na, Ag; MIIII=In, Y)"", Zeitschrift Fur Anorganische und Allgemeine Chemie, vol. 613, No. 7, Jul. 1, 1992 (Jul. 1, 1992), pp. 26-30, XP009522283, ISSN: 0044-2313, DOI: 10.1002/ZAAC.19926130104, Retrieved from the Internet: URL:https://onlinelibrary.wiley.com/doi/10.1002/zaac.19926130104".

International Search Report of PCT application No. PCT/JP2019/025437 dated Sep. 24, 2019.

Andreas Bohnsack et al., "The bromides Li3MBr6 (M=Sm—Lu, Y): Synthesis, Crystal Structure, and Ionic Mobility", Journal of Inorganic and General Chemistry, Sep. 1997, vol. 623/Issue 9, pp. 1352-1356.

Ewa Kowalczyk et al., "Studies on the reaction of ammonium fluoride with lithium carbonate and yttrium oxide", Thermochimica Acta, vol. 265, 1995, pp. 189-195.

Andreas Bohnsack et al., "Ternary Chlorides of the Rare-Earth Elements with Lithium, Li3MCl6 (M=Tb—Lu, Y, Sc): Synthesis, Crystal Structures, and Ionic Motion", Journal of Inorganic and General Chemistry, Jul. 1997, vol. 623/Issue 7, pp. 1067-1073.

International Search Report of PCT application No. PCT/JP2019/025440 dated Sep. 24, 2019.

The Extended European Search Report dated Jan. 27, 2022 for the related European Patent Application No. 19904166.6.

Non-Final Rejection issued in corresponding U.S. Appl. No. 17/321,481, dated Nov. 22, 2023.

* cited by examiner

HALIDE PRODUCTION METHOD

BACKGROUND

1. Technical Field

The present disclosure relates to a method for producing halides.

2. Description of the Related Art

International Publication No. 2018/025582 discloses a method for producing halide solid electrolytes.

SUMMARY

The production of halides using an industrially cost-effective method has been anticipated in the related art.

In one general aspect, the techniques disclosed here feature a method for producing a halide, the method including heat-treating a mixed material in an inert gas atmosphere, the mixed material being a mixture of $(NH_4)_a MX_{3+a}$ and LiZ. The M includes at least one element selected from the group consisting of Y, a lanthanoid, and Sc. The X is at least one element selected from the group consisting of Cl, Br, I, and F. The Z is at least one element selected from the group consisting of Cl, Br, I, and F. Moreover, $0 < a \leq 3$ is satisfied.

According to the present disclosure, it may become possible to produce halides by an industrially cost-effective method.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

An embodiment is described below with reference to the attached drawings.

Embodiment 1

Figure 1:
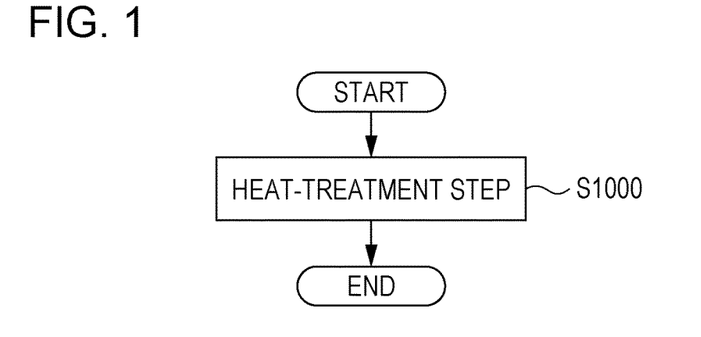
FIG. 1 is a flowchart illustrating an example of a production method according to Embodiment 1.

FIG. 1 is a flowchart illustrating an example of a production method according to Embodiment 1.

The production method according to Embodiment 1 includes a heat-treatment step S1000. The heat-treatment step S1000 is a step of heat-treating a mixed material in an inert gas atmosphere.

The mixed material that is to be heat-treated in the heat-treatment step S1000 is a mixture of $(NH_4)_a MX_{3+a}$ and LiZ.

M includes at least one element selected from the group consisting of Y (i.e., yttrium), a lanthanoid (i.e., at least one element selected from the group consisting of La, Ce, Pr, Nd, Pm, Sm, Eu, Gd, Tb, Dy, Ho, Er, Tm, Yb, and Lu), and Sc (i.e., scandium).

X is at least one element selected from the group consisting of Cl, Br, I, and F.

Z is at least one element selected from the group consisting of Cl, Br, I, and F.

Furthermore, $0 < a \leq 3$ is satisfied.

This makes it possible to produce halides by an industrially cost-effective method (e.g., a method that allows mass production at low costs). Specifically, it may become possible to produce halides including Li (i.e., lithium) and M by an easy and simple method (i.e., performing heat-treatment in an inert gas atmosphere) without performing vacuum tube sealing or using a planetary ball mill. In addition, since "$(NH_4)_a MX_{3+a}$", which is one of the raw materials, can be synthesized from inexpensive $M_2O_3$ and $NH_4X$ in an easy and simple manner, the manufacturing costs may be further reduced.

In the present disclosure, M may be at least one element selected from the group consisting of Y, Sm, and Gd.

In such a case, a halide having a further high ionic conductivity may be produced.

In the present disclosure, $0.5 \leq a \leq 3$ may be satisfied.

In such a case, a halide having a further high ionic conductivity may be produced.

In the present disclosure, $a = 3$ may be satisfied.

In such a case, a halide having a further high ionic conductivity may be produced.

In the present disclosure, X may be at least one element selected from the group consisting of Cl, Br, and I, and Z may be at least one element selected from the group consisting of Cl, Br, and I.

In such a case, a halide having a further high ionic conductivity may be produced.

For example, in the case where the mixed material that is to be heat-treated in the heat-treatment step S1000 is a mixture of "$(NH_4)_3 YCl_6$" and "LiCl", the reaction represented by Formula (1) below occurs.

$$(NH_4)_3YCl_6 + 3LiCl \rightarrow Li_3YCl_6 + 3NH_3 + 3HCl \quad (1)$$

"$Li_3 YCl_6$" can be produced by the above reaction.

In the heat-treatment step S1000, for example, a powder of the mixed material may be heat-treated in a heating furnace while the powder is charged in a container (e.g., a crucible). In this step, a situation where the mixed material has been heated to a predetermined temperature in an inert gas atmosphere may be maintained for a time period of greater than or equal to a predetermined amount of time. The amount of heat-treatment time may be set such that the composition of the heat-treated product does not change due to the volatilization of halides or the like (i.e., such that the ionic conductivity of the heat-treated product is not impaired).

Examples of the inert gas include helium, nitrogen, and argon.

Subsequent to the heat-treatment step S1000, the heat-treated product may be removed from the container (e.g., a crucible) and pulverized. In such a case, the heat-treated product may be pulverized with a pulverizer (e.g., a mortar or a mixer).

In the present disclosure, the mixed material may be a mixture of a "material represented by $(NH_4)_aMX_{3+a}$ where M is partially replaced with an "other cation" (i.e., a cation other than Y, a lanthanoid, or Sc)" and LiZ. In such a case, the properties (e.g., ionic conductivity) of the halide produced by the production method according to the present disclosure may be improved. The proportion at which M is replaced with the "other cation" may be less than 50 mol %. This enables the production of a halide having a further stable structure.

In the present disclosure, the mixed material may be a mixture of only the two materials, that is, $(NH_4)_aMX_{3+a}$ and LiZ. In the present disclosure, alternatively, the mixed material may be a mixture further including a material other than $(NH_4)_aMX_{3+a}$ or LiZ, in addition to $(NH_4)_aMX_{3+a}$ and LiZ.

In the heat-treatment step S1000, the mixed material may be heat-treated at a temperature of greater than or equal to 300° C. and less than or equal to 650° C.

In such a case, a halide having a high ionic conductivity may be produced by an industrially cost-effective method. Specifically, setting the heat-treatment temperature to be greater than or equal to 300° C. enables $(NH_4)_aMX_{3+a}$ and LiZ to react with each other to a sufficient degree. Moreover, setting the heat-treatment temperature to be less than or equal to 650° C. may suppress the pyrolysis of the halide produced by the solid-phase reaction. This may increase the ionic conductivity of the halide produced by heat-treatment. That is, for example, a halide solid electrolyte having high quality may be produced.

In the heat-treatment step S1000, the mixed material may be heat-treated at a temperature greater than or equal to 500° C. (e.g., a temperature of greater than or equal to 500° C. and less than or equal to 650° C.).

In such a case, a halide having a further high ionic conductivity may be produced by an industrially cost-effective method. Specifically, setting the heat-treatment temperature to be greater than or equal to 500° C. may further enhance the crystallinity of the halide produced by heat-treatment. This may further increase the ionic conductivity of the halide produced by heat-treatment. That is, for example, a halide solid electrolyte having further high quality may be produced.

In the heat-treatment step S1000, the mixed material may be heat-treated for a time period of greater than or equal to 1 hour and less than or equal to 72 hours.

In such a case, a halide having a further high ionic conductivity may be produced by an industrially cost-effective method. Specifically, setting the heat-treatment time to be greater than or equal to 1 hour enables the reaction between $(NH_4)_aMX_{3+a}$ and LiZ to occur to a sufficient degree. Setting the heat-treatment time to be less than or equal to 72 hours may reduce the volatilization of the halide produced by heat-treatment and enables the production of a halide containing constituent elements at an intended compositional ratio (i.e., change in composition may be reduced). This may further increase the ionic conductivity of the halide produced by heat-treatment. That is, for example, a halide solid electrolyte having further high quality may be produced.

Figure 2:
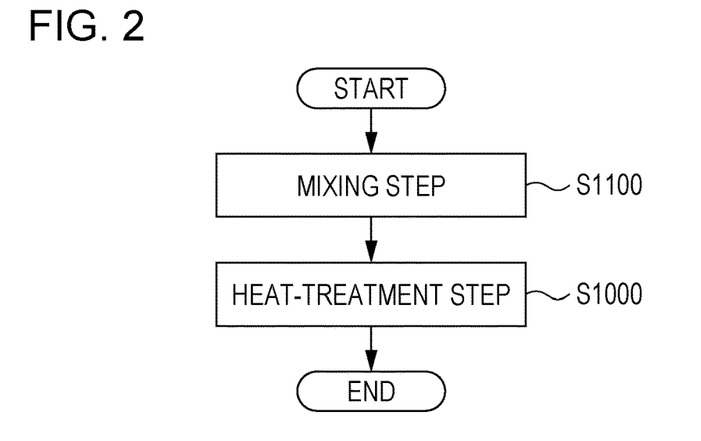
FIG. 2 is a flowchart illustrating another example of the production method according to Embodiment 1.

FIG. 2 is a flowchart illustrating an example of the production method according to Embodiment 1.

As illustrated in FIG. 2, the production method according to Embodiment 1 may further include a mixing step S1100.

The mixing step S1100 is a step conducted prior to the heat-treatment step S1000.

The mixing step S1100 is a step in which $(NH_4)_aMX_{3+a}$ and LiZ used as raw materials are mixed with each other to form a mixed material (i.e., the material that is to be heat-treated in the heat-treatment step S1000).

For mixing the raw materials, commonly known mixers (e.g., a mortar, a blender, and a ball mill) may be used. For example, in the mixing step S1100, each of the raw materials may be prepared in a powder form and the powders of the raw materials may be mixed with one another. In such a case, in the heat-treatment step S1000, the powdery mixed material may be heat-treated. The powdery mixed material prepared in the mixing step S1100 may be formed into pellets by uniaxial pressing. In such a case, in the heat-treatment step S1000, the pellet-form mixed material may be heat-treated to produce the halide.

In the mixing step S1100, a raw material other than $(NH_4)_aMX_{3+a}$ or LiZ may be mixed with $(NH_4)_aMX_{3+a}$ and LiZ to prepare the mixed material.

In the mixing step S1100, the mixed material may be prepared by mixing a "raw material including $(NH_4)_aMX_{3+a}$ as a principal component" and a "raw material including LiZ as a principal component" with each other.

In the mixing step S1100, the molar mixing ratio between $(NH_4)_aMX_{3+a}$ and LiZ may be adjusted by weighing $(NH_4)_aMX_{3+a}$ and LiZ such that they are mixed at an intended molar ratio.

For example, $(NH_4)_3YCl_6$ and LiCl may be mixed with each other at a molar ratio of $(NH_4)_3YCl_6$:LiCl=1:3. In such a case, a compound having a composition of $Li_3YCl_6$ may be produced.

In consideration of the change in composition which may occur in the heat-treatment step S1000, the mixing ratio between $(NH_4)_aMX_{3+a}$ and LiZ may be adjusted in advance such that the change in composition can be canceled out.

Figure 3:
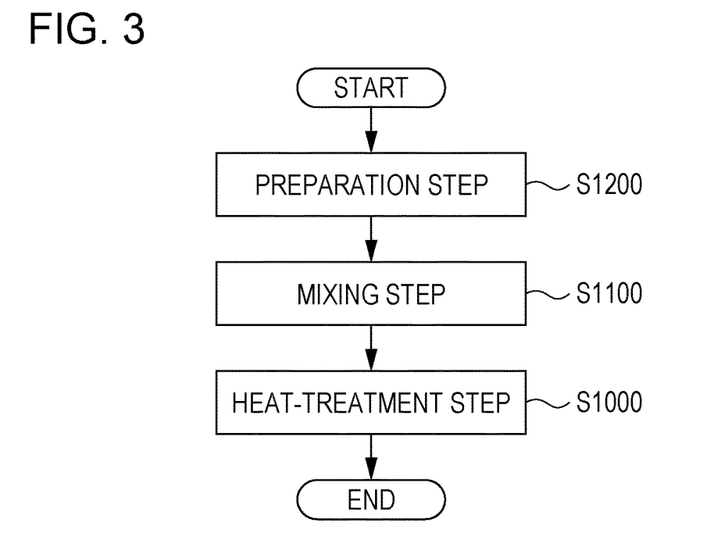
FIG. 3 is a flowchart illustrating another example of the production method according to Embodiment 1.

FIG. 3 is a flowchart illustrating an example of the production method according to Embodiment 1.

As illustrated in FIG. 3, the production method according to Embodiment 1 may further include a preparation step S1200.

The preparation step S1200 is a step conducted prior to the mixing step S1100.

The preparation step S1200 is a step in which the raw materials (i.e., the materials to be mixed with one another in the mixing step S1100), such as $(NH_4)_aMX_{3+a}$ and LiZ, are prepared.

In the preparation step S1200, the raw materials, such as $(NH_4)_aMX_{3+a}$ and LiZ, may be prepared by material synthesis. In the preparation step S1200, alternatively, commonly known commercial materials (e.g., materials having a purity of greater than or equal to 99%) may be used. The raw materials may be dried materials. The raw materials may be in the form of crystals, blocks, flakes, a powder, or the like. In the preparation step S1200, powdery raw materials may be prepared by pulverizing crystalline, blocked, or flaky raw materials.

As described above, the production method according to Embodiment 1 may further include a preparation step S1200 in which $(NH_4)_aMX_{3+a}$ is prepared.

In the preparation step S1200, $(NH_4)_aMX_{3+a}$ may be synthesized by a solid-phase reaction between $M_2O_3$ and $NH_4X$.

In such a case, $(NH_4)_aMX_{3+a}$ may be readily synthesized from inexpensive $M_2O_3$ and $NH_4X$ in an easy and simple manner and, consequently, the manufacturing costs may be further reduced.

An example of the method for synthesizing $(NH_4)_aMX_{3+a}$ is described below.

$M_2O_3$ and $NH_4X$ are weighed such that the molar mixing ratio between $M_2O_3$ and $NH_4X$ is 1:12 and mixed with each other to form a mixture. The mixture is heat-treated at 150° C. to 350° C. The a-value can be changed by the heat-treatment temperature.

For example, in the case where M=Y and X=Cl, that is, $Y_2O_3$ and $NH_4Cl$ are mixed with each other and then heat-treated, the reactions represented by Formulae (2) and (3) below occur.

$$Y_2O_3 + 12NH_4Cl \rightarrow 2(NH_4)_3YCl_6 + 6NH_3 + 3H_2O \quad (2)$$

$$2(NH_4)_3YCl_6 \rightarrow 2(NH_4)_{0.5}YCl_{3.5} + 5NH_4Cl \quad (3)$$

In the case where a mixture of $Y_2O_3$ and $NH_4Cl$ is heat-treated at about 200° C., the reaction represented by Formula (2) occurs to primarily produce $(NH_4)_3YCl_6$. In the case where the above mixture is heat-treated at about 250° C., the reaction represented by Formula (3) occurs to primarily produce $(NH_4)_{0.5}YCl_{3.5}$. As described above, the a-value can be changed by changing the heat-treatment temperature.

The amount of $NH_4X$ mixed with $M_2O_3$ may be set to be excessively large relative to the amount of $M_2O_3$ in order to conduct the above synthesis reaction in a stable manner. For example, the amount of the $NH_4X$ mixed with $M_2O_3$ may be excessively large relative to the amount of $M_2O_3$ so as to be larger by 5 to 15 mol % than a predetermined amount. The atmosphere in which heat-treatment is performed may be an inert atmosphere (e.g., helium, nitrogen, or argon) or a reduced-pressure atmosphere.

The halide produced by the production method according to the present disclosure may be used as a solid-electrolyte material. In such a case, the solid-electrolyte material may be, for example, a solid electrolyte conductive to lithium ions. Such a solid-electrolyte material may be used as, for example, a solid-electrolyte material included in solid-state lithium secondary batteries.

Examples

Details of the present disclosure are described with reference to Examples and Comparative examples below, which are intended to be illustrative and not restrictive of the present disclosure.

In Examples below, the halides prepared by the production method according to the present disclosure were produced and evaluated as a solid-electrolyte material.

Example 1

Preparation of Solid-Electrolyte Material

First, $(NH_4)_3YCl_6$, which served as a raw material for the solid-electrolyte material, was synthesized. $Y_2O_3$ and $NH_4Cl$ were weighed as raw materials such that the molar ratio between $Y_2O_3$ and $NH_4Cl$ was $Y_2O_3:NH_4Cl=1:13.2$ (i.e., weighed such that the amount of $NH_4Cl$ was excessively large relative to the amount of $Y_2O_3$ so as to be larger by 10 mol % than a predetermined amount). The raw materials were pulverized and mixed with each other in an agate mortar. The resulting mixture was charged into an alumina crucible, heated to 200° C. in a nitrogen atmosphere, and then held for 15 hours. Hereby, $(NH_4)_3YCl_6$ was prepared.

Subsequently, a halide solid electrolyte was synthesized using the $(NH_4)_3YCl_6$ and LiCl. The synthesis method used is described below.

$(NH_4)_3YCl_6$ and LiCl were weighed in an argon atmosphere having a dew point of less than or equal to −60° C. such that the molar ratio between $(NH_4)_3YCl_6$ and LiCl was $(NH_4)_3YCl_6:LiCl=1:3$. The above materials were pulverized and mixed with each another in an agate mortar. The resulting mixture was charged into an alumina crucible, heated to 500° C. in an argon atmosphere, and then held for 1 hour.

After heat-treatment had been finished, pulverization was performed with an agate mortar. Hereby, a solid-electrolyte material of Example 1 was prepared.

The Li content in the entire solid-electrolyte material prepared in Example 1 per unit weight was measured by atomic absorption spectrometry. The Y content in the solid-electrolyte material was measured by inductively-coupled plasma emission spectrometry. The Li and Y contents were converted into molar ratio. The Li:Y ratio was 3:1, which was the same as the ratio between the raw materials charged.

Evaluation of Ionic Conductivity

Figure 4:
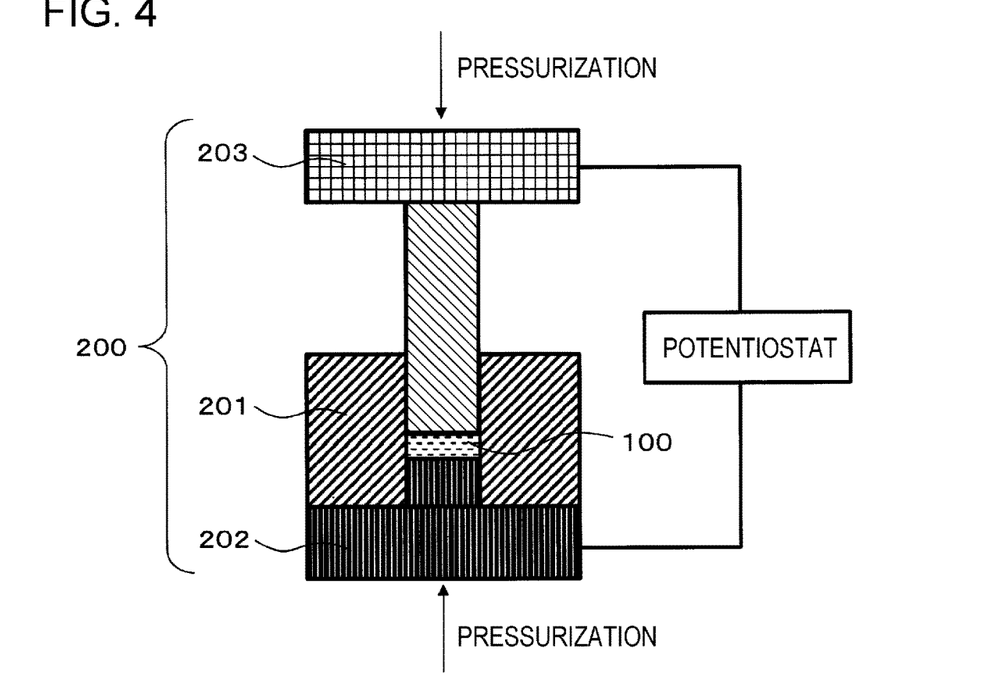
FIG. 4 is a schematic diagram illustrating a method for evaluating ionic conductivity.

FIG. 4 is a schematic diagram illustrating a method for evaluating ionic conductivity.

A pressure molding die 200 is constituted by an electronically insulating die 201 made of polycarbonate and electronically conductive punch upper and lower portions 203 and 202 made of stainless steel.

Ionic conductivity was evaluated by the following method using the structure illustrated in FIG. 4.

In a dry atmosphere having a dew point of less than or equal to −60° C., a solid-electrolyte powder 100 that was a powder of the solid-electrolyte material prepared in Example 1 was charged into the pressure molding die 200 and uniaxially pressed at 300 MPa. Hereby, a conductivity measurement cell of Example 1 was prepared.

While pressurization was done, each of the punch upper portion 203 and the punch lower portion 202 was connected to a potentiostat ("VersaSTAT 4" produced by Princeton Applied Research) including a frequency response analyzer with a wire. Subsequently, ionic conductivity at room temperature was measured by an electrochemical impedance measurement method.

Figure 5:
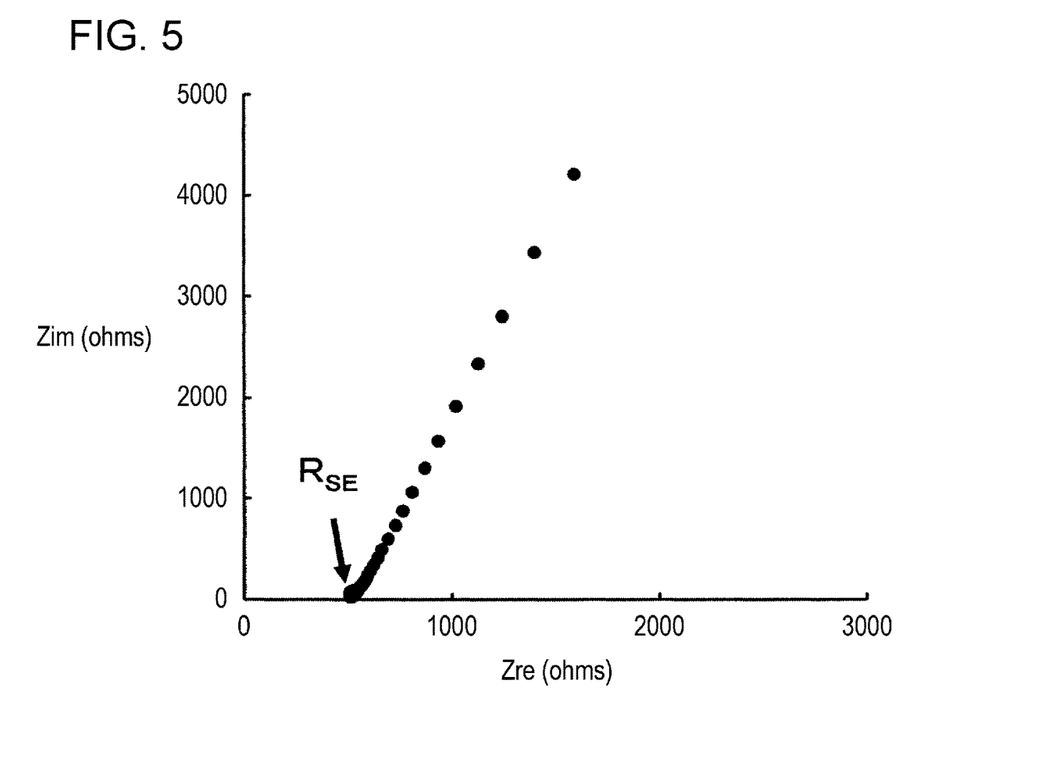
FIG. 5 is a graph illustrating the results of evaluation of ionic conductivity which was made by measuring AC impedance.

FIG. 5 is a graph illustrating the results of evaluation of ionic conductivity which was made by measuring AC impedance. FIG. 5 illustrates the Cole-Cole plot of the results of the measurement of impedance.

In FIG. 5, the real part of the impedance at the measurement point (the arrow in FIG. 5) at which the absolute value of phase of complex impedance was minimum was considered the resistance of the solid electrolyte prepared in Example 1 to ionic conduction. Ionic conductivity was calculated by Formula (4) below, using the resistance of the electrolyte.

$$\sigma = (R_{SE} \times S/t)^{-1} \quad (4)$$

where σ is ionic conductivity, S is the area of the electrolyte (in FIG. 4, the inside diameter of the die 201), $R_{SE}$ is the resistance of the solid electrolyte measured in the above impedance measurement, and t is the thickness of the electrolyte (in FIG. 4, the thickness of the solid-electrolyte powder 100).

The ionic conductivity of the solid-electrolyte material prepared in Example 1 which was measured at 22° C. was $2.1 \times 10^{-4}$ S/cm.

Example 2

Preparation of Solid-Electrolyte Material $(NH_4)_3YCl_6$ was synthesized as in Example 1.

Subsequently, a halide solid electrolyte was synthesized using the $(NH_4)_3YCl_6$ and LiBr. The synthesis method used is described below.

$(NH_4)_3YCl_6$ and LiBr were weighed in an argon atmosphere having a dew point of less than or equal to −60° C. such that the molar ratio between $(NH_4)_3YCl_6$ and LiBr was $(NH_4)_3YCl_6$:LiBr=1:3. The above materials were pulverized and mixed with each another in an agate mortar. The resulting mixture was charged into an alumina crucible, heated to 500° C. in an argon atmosphere, and then held for 1 hour.

After heat-treatment had been finished, pulverization was performed with an agate mortar. Hereby, a solid-electrolyte material of Example 2 was prepared.

Evaluation of Ionic Conductivity

The conductivity measurement cell of Example 2 was prepared and subjected to the measurement of ionic conductivity as in Example 1.

Example 3

The mixture of $(NH_4)_3YCl_6$ and LiBr was heated to 300° C. in an argon atmosphere. A solid-electrolyte material of Example 3 was prepared and subjected to the measurement of ionic conductivity as in Example 2, except the difference in the heat-treatment temperature.

Example 4

The mixture of $(NH_4)_3YCl_6$ and LiBr was heated to 650° C. in an argon atmosphere. A solid-electrolyte material of Example 4 was prepared and subjected to the measurement of ionic conductivity as in Example 2, except the difference in the heat-treatment temperature.

Example 5

Preparation of Solid-Electrolyte Material

A halide solid electrolyte was synthesized using the $(NH_4)_{1.1}YCl_{4.1}$ and LiBr. The synthesis method used is described below.

$(NH_4)_{1.1}YCl_{4.1}$ and LiBr were weighed in an argon atmosphere having a dew point of less than or equal to −60° C. such that the molar ratio between $(NH_4)_{1.1}YCl_{4.1}$ and LiBr was $(NH_4)_{1.1}YCl_{4.1}$:LiBr=1:3. The above materials were pulverized and mixed with each another in an agate mortar. The resulting mixture was charged into an alumina crucible, heated to 500° C. in an argon atmosphere, and then held for 1 hour.

After heat-treatment had been finished, pulverization was performed with an agate mortar. Hereby, a solid-electrolyte material of Example 5 was prepared.

Evaluation of Ionic Conductivity

The conductivity measurement cell of Example 5 was prepared and subjected to the measurement of ionic conductivity as in Example 1.

Example 6

Preparation of Solid-Electrolyte Material

First, $(NH_4)_{0.5}YCl_{3.5}$ was synthesized. The synthesis method used is described below.

$Y_2O_3$ and $NH_4Cl$ were weighed as raw materials such that the molar ratio between $Y_2O_3$ and $NH_4Cl$ was $Y_2O_3$:$NH_4Cl$=1:13.2 (the amount of $NH_4Cl$ was excessively large relative to the amount of $Y_2O_3$ so as to be larger by 10 mol % than a predetermined amount). The raw materials were pulverized and mixed with each other in an agate mortar. The resulting mixture was charged into an alumina crucible, heated to 350° C. in a nitrogen atmosphere, and then held for 15 hours. Hereby, $(NH_4)_{0.5}YCl_{3.5}$ was prepared.

Subsequently, a halide solid electrolyte was synthesized using the $(NH_4)_{0.5}YCl_{3.5}$ and LiBr. The synthesis method used is described below.

$(NH_4)_{0.5}YCl_{3.5}$ and LiBr were weighed in an argon atmosphere having a dew point of less than or equal to −60° C. such that the molar ratio between $(NH_4)_{0.5}YCl_{3.5}$ and LiBr was $(NH_4)_{0.5}YCl_{3.5}$:LiBr=1:3. The above materials were pulverized and mixed with each another in an agate mortar. The resulting mixture was charged into an alumina crucible, heated to 500° C. in an argon atmosphere, and then held for 1 hour.

After heat-treatment had been finished, pulverization was performed with an agate mortar. Hereby, a solid-electrolyte material of Example 6 was prepared.

Evaluation of Ionic Conductivity

The conductivity measurement cell of Example 6 was prepared and subjected to the measurement of ionic conductivity as in Example 1.

Example 7

A solid-electrolyte material of Example 7 was prepared and subjected to the measurement of ionic conductivity as in Example 6, except that $(NH_4)_{0.25}YCl_{3.25}$ was used instead of $(NH_4)_{0.5}YCl_{3.5}$.

Example 8

A solid-electrolyte material of Example 8 was prepared and subjected to the measurement of ionic conductivity as in Example 6, except that $(NH_4)_{0.02}YCl_{3.02}$ was used instead of $(NH_4)_{0.5}YCl_{3.5}$.

Example 9

Preparation of Solid-Electrolyte Material

First, $(NH_4)_3YBr_6$ was synthesized. The synthesis method used is described below.

$Y_2O_3$ and $NH_4Br$ were weighed as raw materials such that the molar ratio between $Y_2O_3$ and $NH_4Br$ was $Y_2O_3$:$NH_4Br$=1:13.2 (the amount of $NH_4Br$ was excessively large relative to the amount of $Y_2O_3$ so as to be larger by 10 mol % than a predetermined amount). The raw materials were pulverized and mixed with each other in an agate mortar. The resulting mixture was charged into an alumina crucible, heated to 200° C. in a nitrogen atmosphere, and then held for 15 hours. Hereby, $(NH_4)_3YBr_6$ was prepared.

Subsequently, a halide solid electrolyte was synthesized using the $(NH_4)_3YBr_6$ and LiCl. The synthesis method used is described below.

$(NH_4)_3YBr_6$ and LiCl were weighed in an argon atmosphere having a dew point of less than or equal to −60° C. such that the molar ratio between $(NH_4)_3YBr_6$ and LiCl was $(NH_4)_3YBr_6$:LiCl=1:3. The above materials were pulverized and mixed with each another in an agate mortar. The resulting mixture was charged into an alumina crucible, heated to 500° C. in an argon atmosphere, and then held for 1 hour.

After heat-treatment had been finished, pulverization was performed with an agate mortar. Hereby, a solid-electrolyte material of Example 9 was prepared.

Evaluation of Ionic Conductivity

The conductivity measurement cell of Example 9 was prepared and subjected to the measurement of ionic conductivity as in Example 1.

Example 10

A solid-electrolyte material of Example 10 was prepared and subjected to the measurement of ionic conductivity as in Example 9, except that LiBr was used instead of LiCl as a raw material mixed with $(NH_4)_3YBr_6$.

Example 11

Preparation of Solid-Electrolyte Material

First, $(NH_4)_3SmBr_6$ was synthesized. The synthesis method used is described below.

$Sm_2O_3$ and $NH_4Br$ were weighed as raw materials such that the molar ratio between $Sm_2O_3$ and $NH_4Br$ was $Sm_2O_3$:$NH_4Br$=1:13.2 (the amount of $NH_4Br$ was excessively large relative to the amount of $Sm_2O_3$ so as to be larger by 10 mol % than a predetermined amount). The raw materials were pulverized and mixed with each other in an agate mortar. The resulting mixture was charged into an alumina crucible, heated to 200° C. in a nitrogen atmosphere, and then held for 15 hours. Hereby, $(NH_4)_3SmBr_6$ was prepared Subsequently, a halide solid electrolyte was synthesized using the $(NH_4)_3SmBr_6$ and LiI. The synthesis method used is described below.

$(NH_4)_3SmBr_6$ and LiI were weighed in an argon atmosphere having a dew point of less than or equal to −60° C. such that the molar ratio between $(NH_4)_3SmBr_6$ and LiI was $(NH_4)_3SmBr_6$:LiI=1:3. The above materials were pulverized and mixed with each another in an agate mortar. The resulting mixture was charged into an alumina crucible, heated to 500° C. in an argon atmosphere, and then held for 1 hour.

After heat-treatment had been finished, pulverization was performed with an agate mortar. Hereby, a solid-electrolyte material of Example 11 was prepared.

Evaluation of Ionic Conductivity

The conductivity measurement cell of Example 11 was prepared and subjected to the measurement of ionic conductivity as in Example 1.

Example 12

Preparation of Solid-Electrolyte Material

First, $(NH_4)_3GdBr_6$ was synthesized. The synthesis method used is described below.

$Gd_2O_3$ and $NH_4Br$ were weighed as raw materials such that the molar ratio between $Gd_2O_3$ and $NH_4Br$ was $Gd_2O_3$:$NH_4Br$=1:13.2 (the amount of $NH_4Br$ was excessively large relative to the amount of $Gd_2O_3$ so as to be larger by 10 mol % than a predetermined amount). The raw materials were pulverized and mixed with each other in an agate mortar. The resulting mixture was charged into an alumina crucible, heated to 200° C. in a nitrogen atmosphere, and then held for 15 hours. Hereby, $(NH_4)_3GdBr_6$ was prepared.

Subsequently, a halide solid electrolyte was synthesized using the $(NH_4)_3GdBr_6$ and LiCl. The synthesis method used is described below.

$(NH_4)_3GdBr_6$ and LiCl were weighed in an argon atmosphere having a dew point of less than or equal to −60° C. such that the molar ratio between $(NH_4)_3GdBr_6$ and LiCl was $(NH_4)_3GdBr_6$:LiCl=1:3. The above materials were pulverized and mixed with each another in an agate mortar. The resulting mixture was charged into an alumina crucible, heated to 500° C. in an argon atmosphere, and then held for 1 hour.

After heat-treatment had been finished, pulverization was performed with an agate mortar. Hereby, a solid-electrolyte material of Example 12 was prepared.

Evaluation of Ionic Conductivity

The conductivity measurement cell of Example 12 was prepared and subjected to the measurement of ionic conductivity as in Example 1.

Example 13

A solid-electrolyte material of Example 13 was prepared and subjected to the measurement of ionic conductivity as in Example 12, except that LiBr was used instead of LiCl as a raw material mixed with $(NH_4)_3GdBr_6$.

Example 14

A solid-electrolyte material of Example 14 was prepared and subjected to the measurement of ionic conductivity as in Example 12, except that LiI was used instead of LiCl as a raw material mixed with $(NH_4)_3GdBr_6$.

Comparative Examples 1 to 6

Preparation of Solid-Electrolyte Material

In Comparative examples 1 to 6, raw-material powders were weighed in an argon atmosphere having a dew point of less than or equal to −60° C.

In Comparative example 1, $YCl_3$ and LiCl were weighed such that the molar ratio between $YCl_3$ and LiCl was $YCl_3$:LiCl=1:3.

In Comparative example 2, $YCl_3$ and LiBr were weighed such that the molar ratio between $YCl_3$ and LiBr was $YCl_3$:LiBr=1:3.

In Comparative example 3, $YBr_3$ and LiBr were weighed such that the molar ratio between $YBr_3$ and LiBr was $YBr_3$:LiBr=1:3.

In Comparative example 4, $SmBr_3$ and LiI were weighed such that the molar ratio between $SmBr_3$ and LiI was $SmBr_3$:LiI=1:3.

In Comparative example 5, $GdBr_3$ and LiBr were weighed such that the molar ratio between $GdBr_3$ and LiBr was $GdBr_3$:LiBr=1:3.

In Comparative example 6, $GdBr_3$ and LiI were weighed such that the molar ratio between $GdBr_3$ and LiI was $GdBr_3$:LiI=1:3.

The above materials were pulverized and mixed with one another in an agate mortar. Then, the raw material powders were mixed and pulverized by mechanochemical milling to react with one another. Hereby, solid-electrolyte materials of Comparative examples 1 to 6 were prepared.

Evaluation of Ionic Conductivity

The conductivity measurement cells of Comparative examples 1 to 6 were prepared and subjected to the measurement of ionic conductivity as in Example 1.

Table 1 describes the structures and evaluation results of Examples 1 to 14 and Comparative examples 1 to 6.

TABLE 1

| | Raw material 1 $(NH_4)_aMX_{a+3}$ | | Raw material 2 LiZ | Molar mixing ratio Raw materials 1:2 | Heat-treatment temperature (° C.) | Solid electrolyte Li—M—XZ | ionic conductivity (S/cm) |
|---|---|---|---|---|---|---|---|
| | M | X | a-Value | | | | | |
| Example 1 | Y | Cl | 3 | LiCl | 1:3 | 500 | Li—Y—Cl | $2.1 \times 10^{-4}$ |
| Example 2 | Y | Cl | 3 | LiBr | 1:3 | 500 | Li—Y—Br—Cl | $1.9 \times 10^{-3}$ |
| Example 3 | Y | Cl | 3 | LiBr | 1:3 | 300 | Li—Y—Br—Cl | $8.5 \times 10^{-5}$ |
| Example 4 | Y | Cl | 3 | LiBr | 1:3 | 650 | Li—Y—Br—Cl | $1.2 \times 10^{-3}$ |
| Example 5 | Y | Cl | 1.1 | LiBr | 1:3 | 500 | Li—Y—Br—Cl | $1.8 \times 10^{-3}$ |
| Example 6 | Y | Cl | 0.5 | LiBr | 1:3 | 500 | Li—Y—Br—Cl | $1.5 \times 10^{-3}$ |
| Example 7 | Y | Cl | 0.25 | LiBr | 1:3 | 500 | Li—Y—Br—Cl | $1.7 \times 10^{-3}$ |
| Example 8 | Y | Cl | 0.02 | LiBr | 1:3 | 500 | Li—Y—Br—Cl | $1.7 \times 10^{-3}$ |
| Example 9 | Y | Br | 3 | LiCl | 1:3 | 500 | Li—Y—Br—Cl | $1.9 \times 10^{-3}$ |
| Example 10 | Y | Br | 3 | LiBr | 1:3 | 500 | Li—Y—Br | $2.8 \times 10^{-4}$ |
| Example 11 | Sm | Br | 3 | LiI | 1:3 | 500 | Li—Sm—Br—I | $4.5 \times 10^{-4}$ |
| Example 12 | Gd | Br | 3 | LiCl | 1:3 | 500 | Li—Gd—Br—Cl | $1.5 \times 10^{-3}$ |
| Example 13 | Gd | Br | 3 | LiBr | 1:3 | 500 | Li—Gd—Br | $1.3 \times 10^{-3}$ |
| Example 14 | Gd | Br | 3 | LiI | 1:3 | 500 | Li—Gd—Br—I | $2.6 \times 10^{-4}$ |
| Comparative example 1 | YCl$_3$ | | | LiCl | 1:3 | Mechano-chemical milling | Li—Y—Cl | $3.0 \times 10^{-4}$ |
| Comparative example 2 | YCl$_3$ | | | LiBr | 1:3 | | Li—Y—Br—Cl | $1.0 \times 10^{-3}$ |
| Comparative example 3 | YBr$_3$ | | | LiBr | 1:3 | | Li—Y—Br | $3.0 \times 10^{-4}$ |
| Comparative example 4 | SmBr$_3$ | | | LiI | 1:3 | | Li—Sm—Br—I | $1.5 \times 10^{-3}$ |
| Comparative example 5 | GdBr$_3$ | | | LiBr | 1:3 | | Li—Gd—Br | $6.0 \times 10^{-4}$ |
| Comparative example 6 | GdBr$_3$ | | | LiI | 1:3 | | Li—Gd—Br—I | $1.1 \times 10^{-3}$ |

Discussions

It was confirmed that ionic conductivity comparable to the ionic conductivities of the solid-electrolyte materials synthesized by the mechanochemical milling reactions in Comparative examples 1 to 6 was achieved in Examples 1 to 14.

The above results confirm that the solid-electrolyte material synthesized by the production method according to the present disclosure may have a high lithium ion conductivity. Moreover, the production method according to the present disclosure is an easy and simple method. Furthermore, this production method is industrially cost-effective. Since $(NH_4)_aMX_{3+a}$ can be readily synthesized by a solid-phase reaction between inexpensive $M_2O_3$ and $NH_4X$ in an easy and simple manner, the cost may be further reduced.

The production method according to the present disclosure may be used as, for example, a method for producing a solid-electrolyte material. The solid-electrolyte material produced by the production method according to the present disclosure may be included in, for example, a solid-state lithium secondary battery.

What is claimed is:

1. A method for producing a halide, the method comprising:
   heat-treating a mixed material in an inert gas atmosphere, the mixed material being a mixture of $(NH_4)_aMX_3+a$ and LiZ,
   wherein the M includes at least one element selected from the group consisting of Y, a lanthanoid, and Sc,
   wherein the X is at least one element selected from the group consisting of Cl, Br, I, and F,
   wherein the Z is at least one element selected from the group consisting of Cl, Br, I, and F,
   wherein $0 < a \leq 3$ is satisfied, and
   wherein, in the heat-treating, the mixed material is heat-treated at a temperature of greater than or equal to 500° C. and less than or equal to 650° C.

2. The method for producing a halide according to claim 1, wherein, in the heat-treating, the mixed material is heat-treated for a time period of greater than or equal to 1 hour and less than or equal to 72 hours.

3. The method for producing a halide according to claim 1, wherein the M is at least one element selected from the group consisting of Y, Sm, and Gd.

4. The method for producing a halide according to claim 1, wherein $0.5 \leq a \leq 3$ is satisfied.

5. The method for producing a halide according to claim 4, wherein a=3.

6. The method for producing a halide according to claim 1, wherein the X is at least one element selected from the group consisting of Cl, Br, and I, and wherein the Z is at least one element selected from the group consisting of Cl, Br, and I.

7. The method for producing a halide according to claim 1, the method further comprising:
   preparing the $(NH_4)_aMX_3+a$,
   wherein, in the preparing, the $(NH_4)_aMX_{3+a}$ is synthesized by a solid-phase reaction between $M_2O_3$ and $NH_4X$.

8. The method for producing a halide according to claim 7, further comprising:
   after the $(NH_4)_aMX_{3+a}$ is synthesized, weighing the $(NH_4)_aMX_{3+a}$ and the LiZ according to a desired molar ratio; and
   pulverizing and mixing the $(NH_4)_aMX_{3+a}$ and the LiZ to form the mixed material.

9. The method for producing a halide according to claim 1, further comprising:
weighing the $(NH_4)_a MX_{3+a}$ and the LiZ according to a desired molar ratio; and
pulverizing and mixing the $(NH_4)_a MX_{3+a}$ and the LiZ to form the mixed material.

10. The method for producing a halide according to claim 6, wherein X is different from Z.

11. A method for producing a halide, the method comprising:
heat-treating a mixed material in an inert gas atmosphere, the mixed material being a mixture of $(NH_4)_a MX_{3+a}$ and LiZ,
wherein the X is at least one element selected from the group consisting of Cl, Br, I, and F,
wherein the Z is at least one element selected from the group consisting of Cl, Br, I, and F,
wherein $0 < a \leq 3$ is satisfied, and
wherein M is Y.

12. The method for producing a halide according to claim 11, wherein a=3.

13. The method for producing a halide according to claim 11, further comprising:
weighing the $(NH_4)_a MX_{3+a}$ and the LiZ according to a desired molar ratio; and
pulverizing and mixing the $(NH_4)_a MX_{3+a}$ and the LiZ to form the mixed material.

14. The method for producing a halide according to claim 11, wherein X is different from Z.

15. A method for producing a halide, the method comprising:
heat-treating a mixed material in an inert gas atmosphere, the mixed material being a mixture of $(NH_4)_a MX_{3+a}$ and LiZ,
wherein the M includes at least one element selected from the group consisting of Y, a lanthanoid, and Sc,
wherein the X is at least one element selected from the group consisting of Cl, Br, I, and F,
wherein the Z is at least one element selected from the group consisting of Cl, Br, I, and F, and
wherein a=3.

16. The method for producing a halide according to claim 15, further comprising:
weighing the $(NH_4)_a MX_{3+a}$ and the LiZ according to a desired molar ratio; and
pulverizing and mixing the $(NH_4)_a MX_{3+a}$ and the LiZ to form the mixed material.

17. The method for producing a halide according to claim 15, wherein X is different from Z.

18. A method for producing a halide, the method comprising:
heat-treating a mixed material in an inert gas atmosphere, the mixed material being a mixture of $(NH_4)_a MX_{3+a}$ and LiZ,
wherein the M includes at least one element selected from the group consisting of Y, a lanthanoid, and Sc,
wherein the X is at least one element selected from the group consisting of Cl, Br, I, and F,
wherein the Z is at least one element selected from the group consisting of Cl, Br, I, and F,
wherein $0 < a \leq 3$ is satisfied, and
wherein, in the heat-treating, the mixed material is heat-treated at a temperature of greater than or equal to 500° C.

19. The method for producing a halide according to claim 18, further comprising:
weighing the $(NH_4)_a MX_{3+a}$ and the LiZ according to a desired molar ratio; and
pulverizing and mixing the $(NH_4)_a MX_{3+a}$ and the LiZ to form the mixed material.

20. The method for producing a halide according to claim 18, wherein X is different from Z.

* * * * *